United States Patent
Moon et al.

(10) Patent No.: US 9,205,984 B2
(45) Date of Patent: Dec. 8, 2015

(54) DRIVE ROLLER FOR BALER OR OTHER EQUIPMENT

(71) Applicants: Scott W. Moon, Milwaukee, WI (US); Keith A. Johnson, Kewaskum, WI (US)

(72) Inventors: Scott W. Moon, Milwaukee, WI (US); Keith A. Johnson, Kewaskum, WI (US)

(73) Assignee: Kondex Corporation, Lomira, WI (US)

( * ) Notice: Subject to any disclaimer, the term of this patent is extended or adjusted under 35 U.S.C. 154(b) by 128 days.

(21) Appl. No.: 13/901,278

(22) Filed: May 23, 2013

(65) Prior Publication Data
US 2014/0346015 A1 Nov. 27, 2014

(51) Int. Cl.
*B65G 15/60* (2006.01)
*A01F 15/18* (2006.01)

(52) U.S. Cl.
CPC .............. *B65G 15/60* (2013.01); *A01F 15/18* (2013.01); *A01F 2015/186* (2013.01); *Y10T 29/4956* (2015.01)

(58) Field of Classification Search
CPC ....... A01D 57/20; A01D 61/002; B65G 15/60
USPC .......................................................... 56/341
See application file for complete search history.

(56) References Cited

U.S. PATENT DOCUMENTS

| | | | | |
|---|---|---|---|---|
| 3,859,865 | A * | 1/1975 | Conrad | 198/840 |
| 4,645,404 | A * | 2/1987 | Juravic | 414/416.05 |
| 5,016,747 | A * | 5/1991 | Veenhof | 198/525 |
| 5,181,461 | A * | 1/1993 | Viaud | 100/88 |
| 5,213,202 | A | 5/1993 | Arnold | |
| 5,444,969 | A | 8/1995 | Wagstaff et al. | |
| 6,594,975 | B2 | 7/2003 | Anstey et al. | |
| 8,353,148 | B2 | 1/2013 | Derscheid | |
| 8,484,938 | B2 * | 7/2013 | Cormier et al. | 56/181 |
| 8,579,774 | B2 * | 11/2013 | Derscheid | 492/30 |
| 8,662,131 | B2 * | 3/2014 | Cormier et al. | 156/443 |
| 8,662,132 | B2 * | 3/2014 | Cormier et al. | 156/443 |
| 2008/0034567 | A1* | 2/2008 | Galbreath et al. | 29/428 |
| 2008/0078656 | A1* | 4/2008 | Rhodea et al. | 198/831 |
| 2011/0009251 | A1 | 1/2011 | Derscheid | |
| 2011/0067374 | A1* | 3/2011 | James et al. | 56/341 |
| 2012/0233974 | A1* | 9/2012 | Cormier et al. | 56/181 |
| 2013/0032047 | A1* | 2/2013 | Marques et al. | 100/88 |
| 2014/0041537 | A1* | 2/2014 | Hubach et al. | 100/88 |

FOREIGN PATENT DOCUMENTS

| | | |
|---|---|---|
| EP | 0462484 A2 | 12/1991 |
| EP | 2 499 896 A1 | 9/2012 |
| JP | 2009126608 A | 6/2009 |

* cited by examiner

*Primary Examiner* — Gene Crawford
*Assistant Examiner* — Thomas Randazzo
(74) *Attorney, Agent, or Firm* — Reinhart Boerner Van Deuren P.C.

(57) ABSTRACT

A drive roll for driving and engaging a belt is disclosed as well as a hay baler incorporating such a drive roll. The drive roll includes at least one set and typically many sets of drive ribs, which project from the outer cylindrical surface of the drive roll. The drive roll may be made from steel material while the drive ribs may comprise laser cladding such as tungsten carbide or other high hardness particles. The drive rib may have a tapering profile or other centering structure that corresponds to a belt having end regions with overlay or overlap ends of the drive ribs.

25 Claims, 8 Drawing Sheets

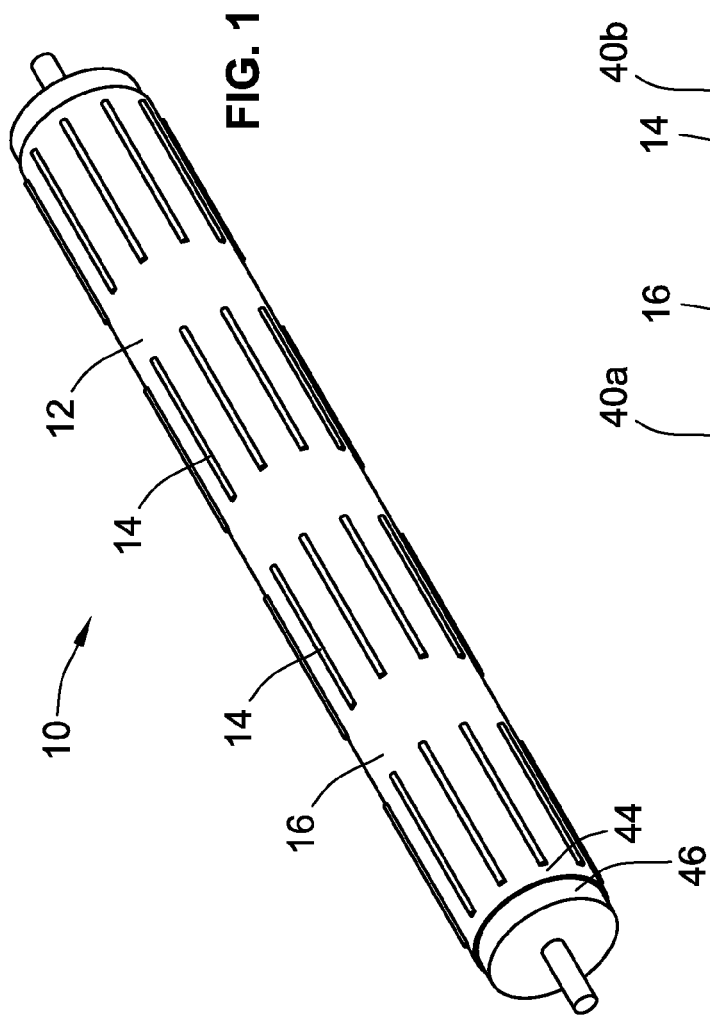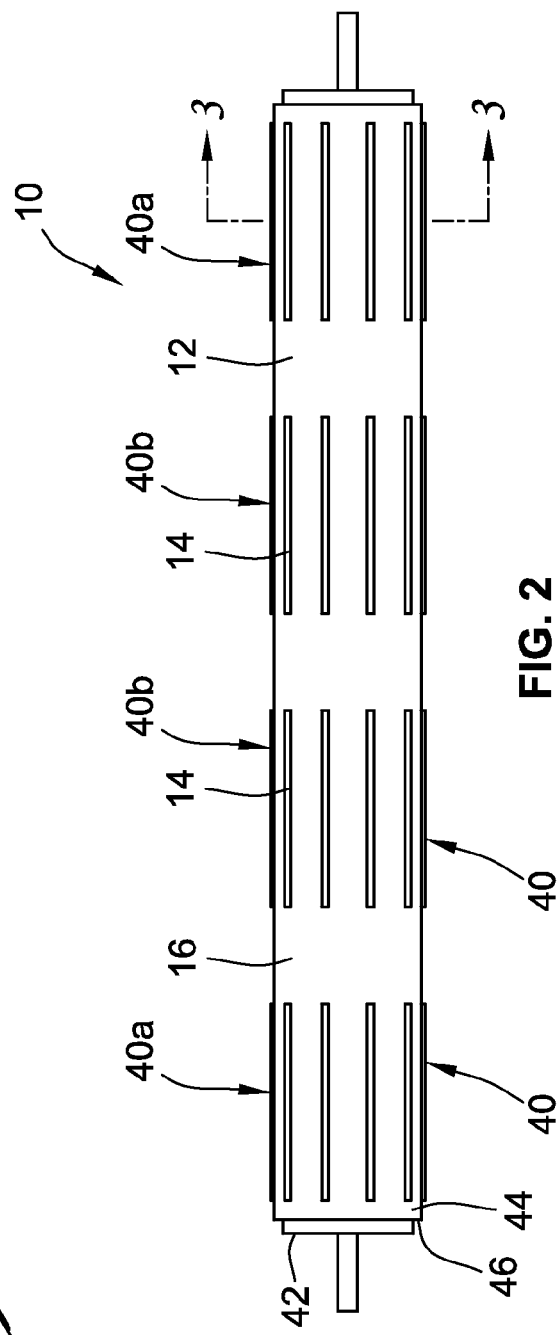

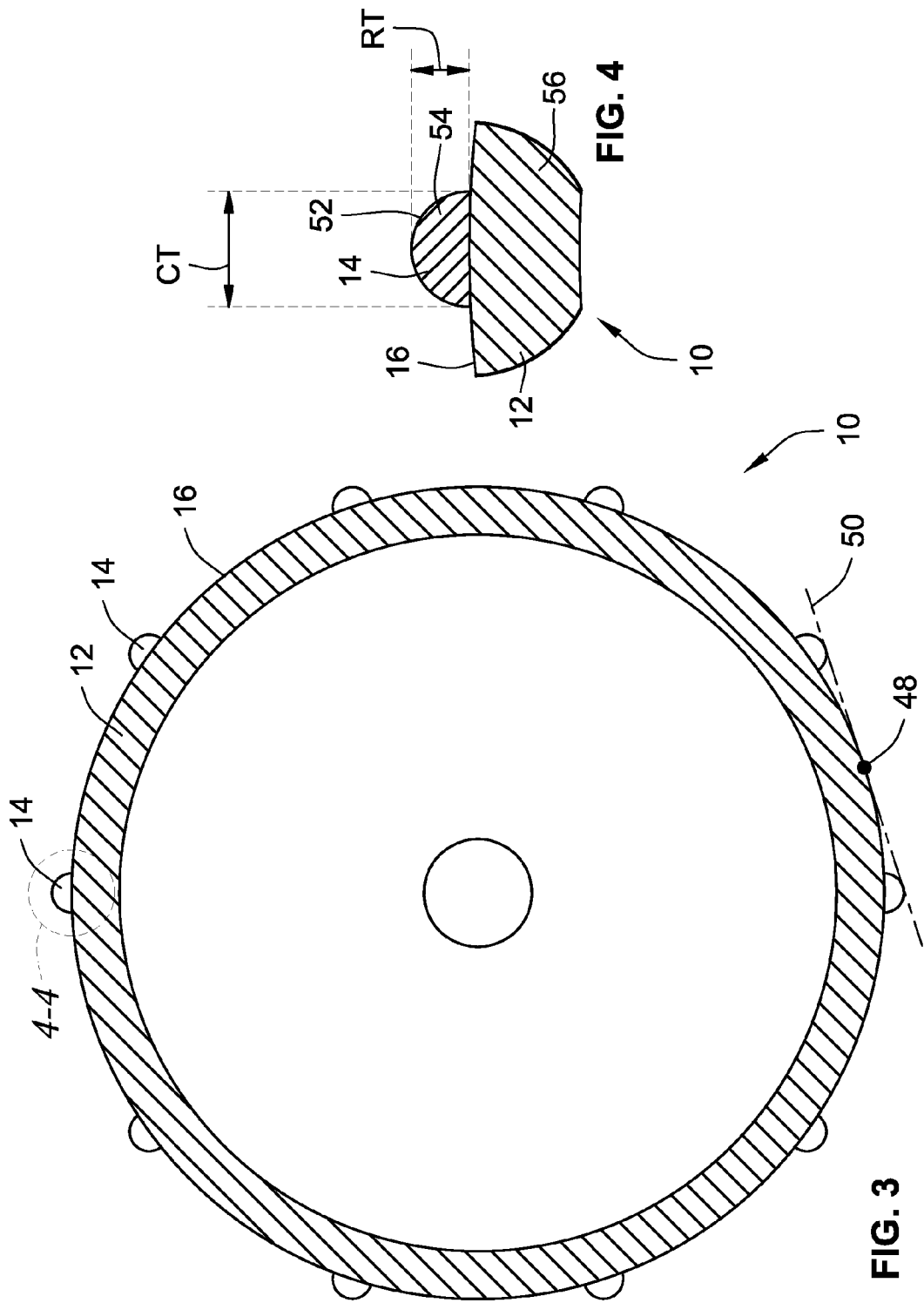

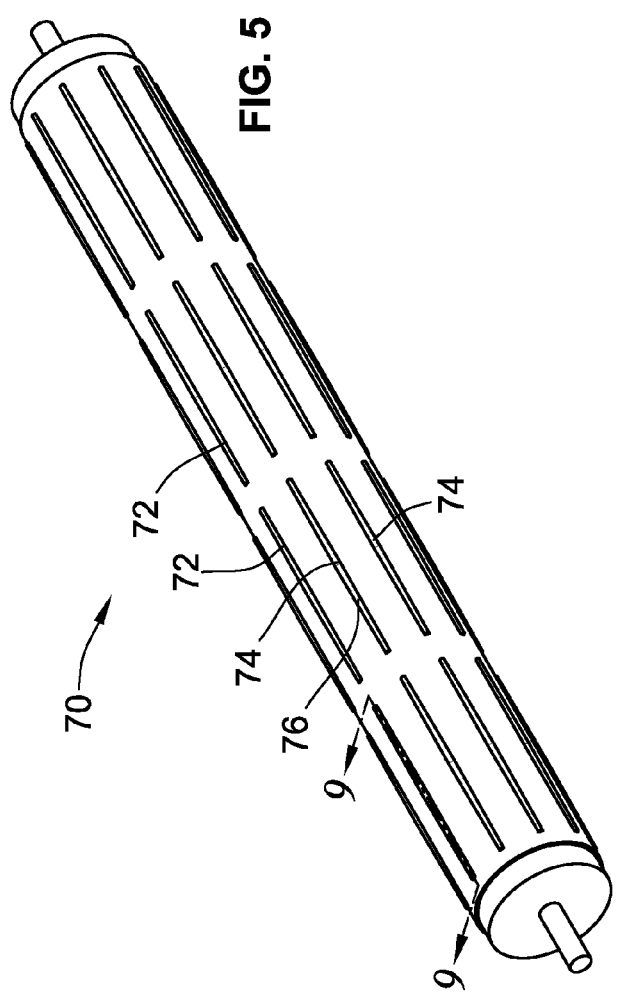
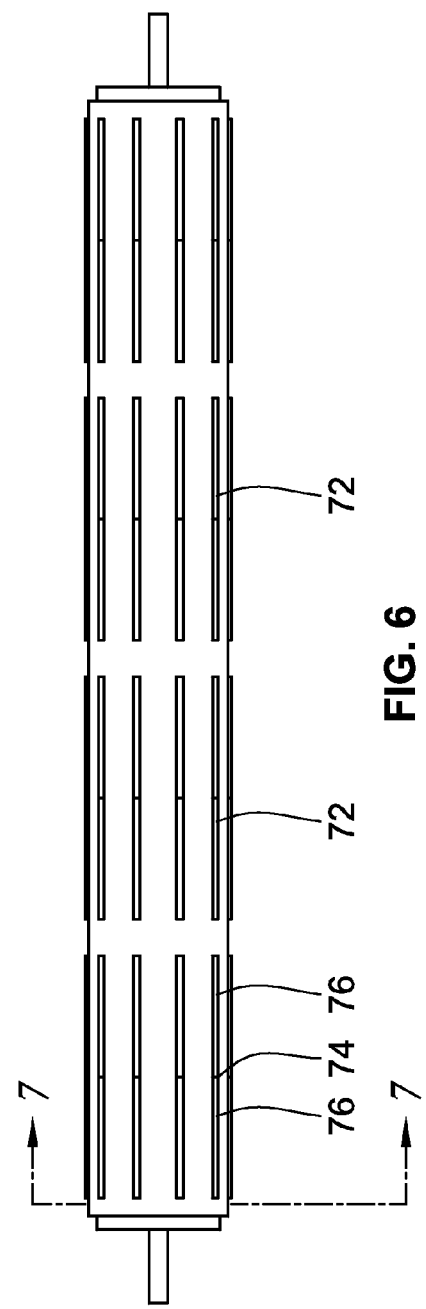

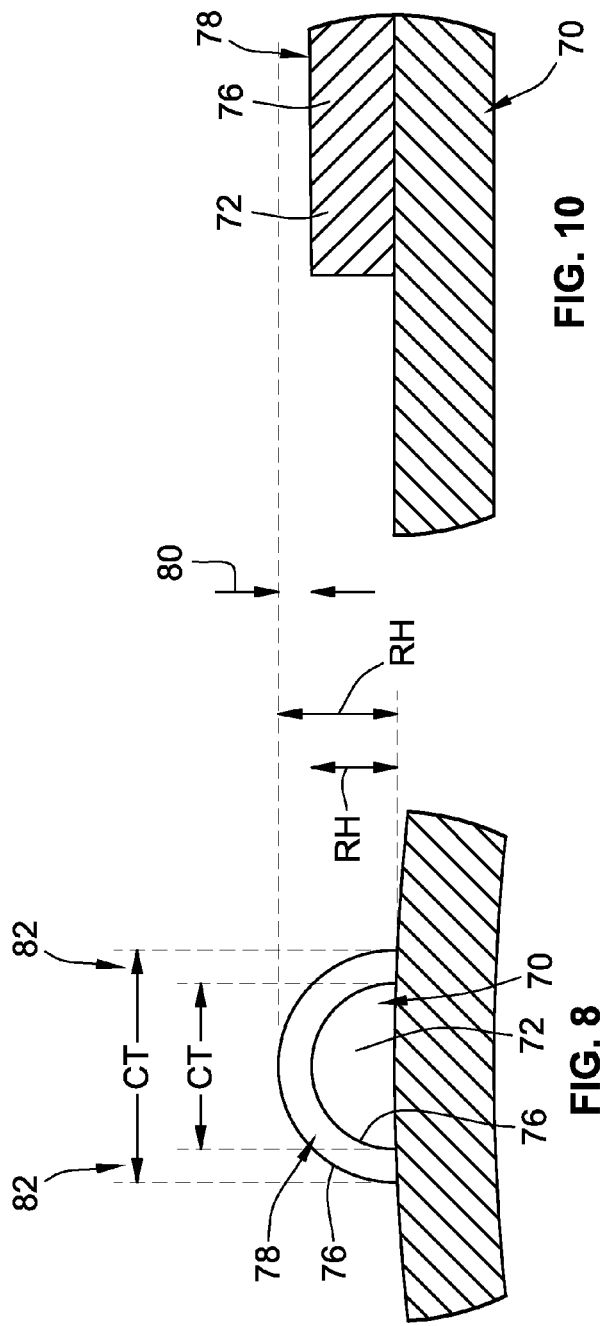

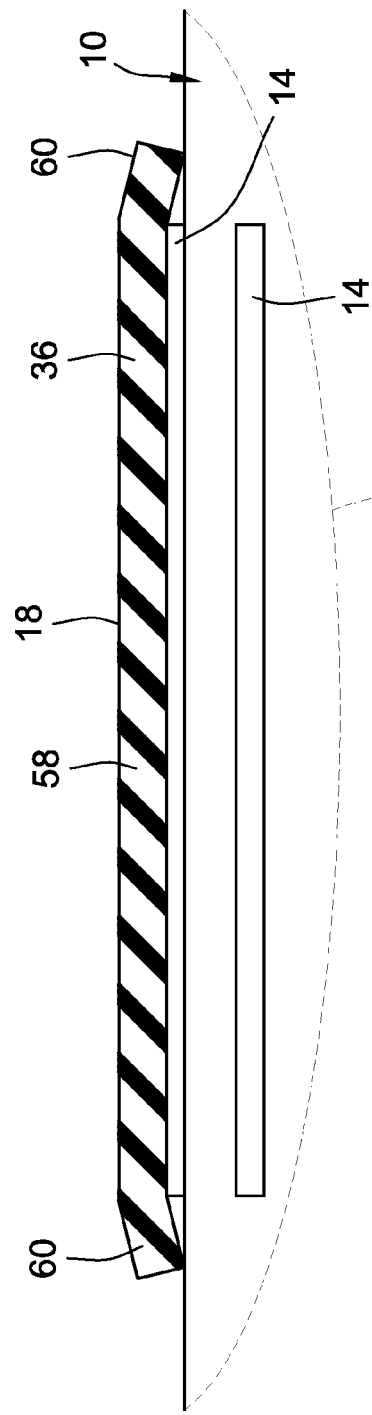
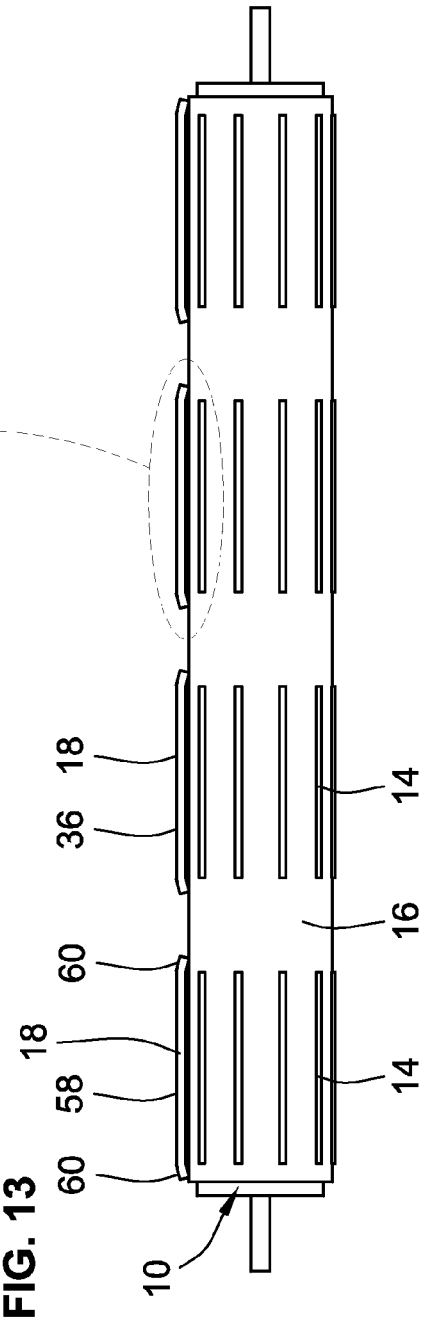

DRIVE ROLLER FOR BALER OR OTHER EQUIPMENT

FIELD OF THE INVENTION

The present invention generally relates to the field of drive rolls and/or to round balers having a baling chamber, in which such drive rolls may be used for driving one or more endless compression belts.

BACKGROUND OF THE INVENTION

Round balers are well known in the art and have been used for some time to produce bales from hay or other harvested crop into round bales. Such balers have an expandable baling chamber and compression elements, which surround that baling chamber. The compression elements comprise a variety of rolls and often a compression belt that partially defines the expandable baler chamber. Typically, multiple compression belts arranged in side by side relation are utilized, such as four compression belts side by side in one application.

Examples of such round balers are shown, for example, in U.S. Publication Number 2013/0032047 to Marques et al.; and U.S. Pat. No. 5,444,969 to Wagstaff et al., the entire disclosures of which are incorporated by reference.

Some of the rolls act as guides and are freely running, while other rolls are driven to impart a driving engagement movement to the endless belt. Often, in prior art systems, the outer perimeter of the driven roll is made of volcanized rubber, which also happens to engage the inner rubber periphery of the compression belts. Heretofore, these compression belts and rolls have suffered from premature wear and failure.

BRIEF SUMMARY OF THE INVENTION

The present invention is directed toward increasing the life span of such rolls and compression belts in such bailers and/or other such applications that have similar issues. The present invention achieves this by providing a drive rib on an outer cylindrical surface of such a drive roll.

According to one inventive aspect, a drive roll comprises a drive roll body adapted for rotation about a central axis. The drive roll body has an outer cylindrical surface. At least one drive rib projects from the outer cylindrical surface. The drive rib has a tapering profile.

In one embodiment, the tapering profile provides means for centering an endless belt.

According to an embodiment, at least five drive ribs are arranged in a set with the drive ribs being angularly spaced at regular intervals about the central axis of the drive roll body. The drive ribs form a drive engagement with an endless belt such that during rotation of the drive roll, the drive ribs successively engage the inner periphery of the endless belt to drive the endless belt.

According to an embodiment or application, multiple sets of drive ribs are provided with each set of drive rib being spaced axially from another set of drive ribs along the outer periphery of the drive roll body. Each set is for driving a different endless belt with at least one intermediate set of drive ribs being disposed intermediate a pair of insets of drive ribs.

The drive ribs preferably have a continuously curved and non-flat outer surface in the circumferential direction, which has the effect during operation of concentrating belt pressure on and circumferentially around the rib to reduce or eliminate micro slippage between the belt and the drive roll.

Preferably, the drive roll will comprise a first material such as steel and the drive rib will comprise a second material of cladding that it integrally clad upon the steel. The cladding may comprise at least one of tungsten carbide, titanium carbide, chrome carbide, iron carbide, diamond, ceramics and other high hardness particles in the range of HV 1200-2500 on the Vickers scale hardness.

Preferably, the height and width of the drive rib are controlled and related to reducing or eliminating micro slippage between the belt and the drive roll. This may be described by different ways for achieving different benefits.

For example, in one embodiment, the height might be defined relative to a tangent wherein at a point intermediate adjacent drive ribs of a set, a tangent is defined. The adjacent drive ribs project radially outward from the cylindrical surface to within 1 millimeter of the tangent. With this configuration, the endless belt will engage the drive ribs and also ride along in contact with at least a portion of the outer cylindrical surface of the drive roll body between adjacent drive ribs.

Preferably, the at least one drive rib has a center region having a maximum radial thickness of between 1 and 10 millimeters.

In a tapered configuration, the central region is sandwiched between end regions on opposed axial sides of the central region. The end regions include a radial thickness that is at least 25% to 100% less than the maximum radial thickness. With this configuration, the central region tapers into the end region with decreasing radial thickness of at least ½ millimeter. This will help to provide for centering of an endless belt on the respective drive roll.

The width or thickness of the drive rib may also be defined. Typically, the drive rib has a central region with a maximum circumferential thickness of between 1 and 10 millimeters.

In a tapered configuration, the central region is sandwiched between end regions on opposed axial sides of the central region. The end regions include a circumferential thickness along the outer cylindrical surface that is at least 25% to 100% less than a maximum circumferential thickness. With this configuration, the central region tapers into the end region with decreasing circumferential thickness of at least ½ millimeter.

The tapering may be continuous, discontinuous, stepped or otherwise. It need not be along a constant line.

According to another aspect, a drive roll for engaging at least one belt comprises a drive roll body having an outer cylindrical surface of a first material. At least one drive rib projects from the outer cylindrical surface that is of a second material different than the first material. A plurality of sets of drive ribs are provided, with each set of drive ribs being spaced axially from another set of drive ribs. At least one intermediate set of drive ribs is provided and disposed intermediate end sets of drive ribs.

Other features or preferred configurations as discussed above or otherwise herein may also be used with this inventive aspect.

According to certain embodiments, a significant application is a hay baler for the drive roll for the purpose of extending the life span and preventing premature failure of endless compression belts used therein. The hay baler, according to this inventive aspect, includes a baler body having therein a bale forming chamber for forming bales. A plurality of guide rolls are mounted in the baler body. At least one endless belt is supported by the guide rolls for movement along an endless path. A portion of the endless belt at any moment, defines at least part of the bale forming chamber. A drive roll is provided for engaging at least one of the endless belts. Drive roll comprises a drive roll body having an outer cylindrical surface of a first material. Further, at least one drive rib projects from the outer cylindrical surface. The at least one drive rib being formed of a different material than the first material.

As was the case above, any of the other features or preferred implementations as discussed above or herein, may also be used with this inventive aspect as well.

Another aspect of the present invention is directed toward a method of forming a drive roll that comprises cladding at least one drive rib onto a drive roll body. The drive roll body has an outer cylindrical surface with the at least one drive rib projecting from the outer cylindrical surface. Further, the method contemplates varying the profile in at least one of the circumferential thickness or radial thickness of the at least one drive rib.

According to a preferred embodiment, the cladding may comprise laser cladding, which may include various ways to vary the profile. For example, such varying may comprise controlling at least one parameter of a laser cladding tool to include at least one of: a) increasing the processing speeds to make thinner sections and decreasing processing speed for making thicker sections; b) varying laser power through a pass to change a deposition rate of cladding; c) varying a powder flow rate through a pass of the tool to change cladding height; and d) making multiple passes of varying length to create a higher profile in a central region of the at least one drive rib.

The method may also comprise forming a plurality of the at least one drive rib in a set with the drive ribs angled of the spaced angular intervals around the central axis of the drive roll body to provide for engagement with an endless belt. During rotation of the drive roll, the drive rib successively engage the at least one endless belt to drive the endless belt. Each of the drive ribs are discreetly formed from each other and aligned substantially parallel with the axis.

Any of the features described above or herein may also be employed according to the method and created by virtue of the method.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is an isometric view of a drive roll according to an embodiment of the present invention;

FIG. 2 is a front view of the drive roll shown in FIG. 1;

FIG. 3 is a cross section view of the drive roll shown in FIG. 2;

FIG. 4 is an enlarged portion of the cross section shown in FIG. 3;

FIG. 5 is an isometric view of a drive roll shown according to another embodiment of the present invention with a tapering profile;

FIG. 6 is a front view of the drive roll shown in FIG. 5;

FIG. 8 and FIG. 10 show enlarged end and profile views of FIG. 7 of the drive rib along with dashed lines showing the height difference between the maximum central region and the minimum at the end region;

FIG. 9 is an enlarged view of a portion of the cross section taken near or approximate line 9-9 in FIG. 6;

FIG. 12 and FIG. 13 show a drive roll of either one of the previous embodiments being used to drive four sets of endless compression belts utilized in the hay baler shown in FIG. 11.

FIG. 13a is an enlarged view of a rib in FIG. 13.

Figure 7:
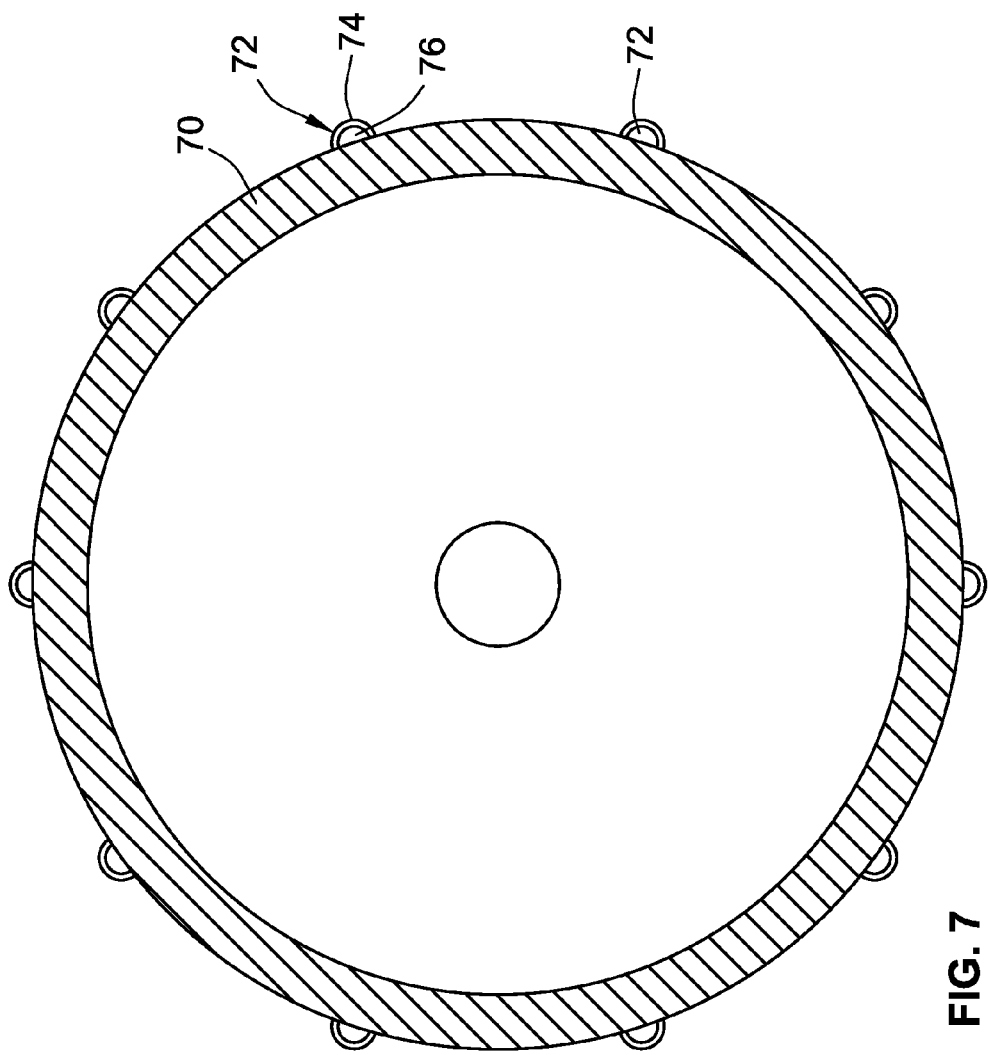
FIG. 7 is a cross section of the drive roll shown in FIG. 6.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As shown in FIG. 1, the drive roll 10 according to a first embodiment comprises a generally cylindrical drive roll body 12 and a plurality of drive ribs 14 that project from the outer cylindrical surface 16 of the drive roll body 12. The drive roll 10 is used for driving a plurality of compression belts 18 of a round baler 20.

Therefore, prior to turning to additional details of the drive roll, attention will first be directed toward an embodiment of the round baler 20 employing the drive roll 10.

Figure 11:
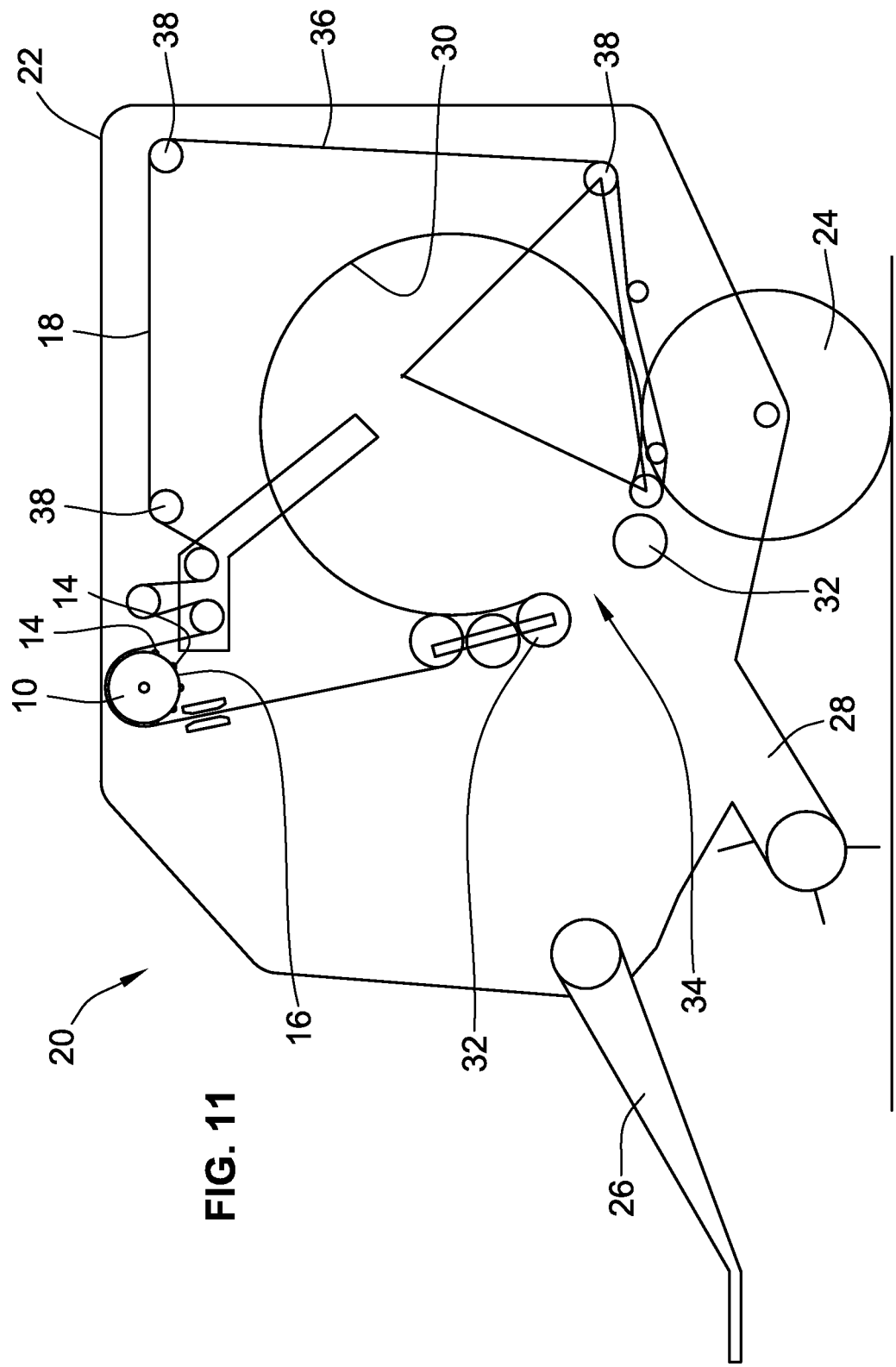
FIG. 11 is a partly schematic cross sectional side illustration of a round hay baler according to an embodiment of the present invention employing the drive roll of either embodiments.
Figure 12:
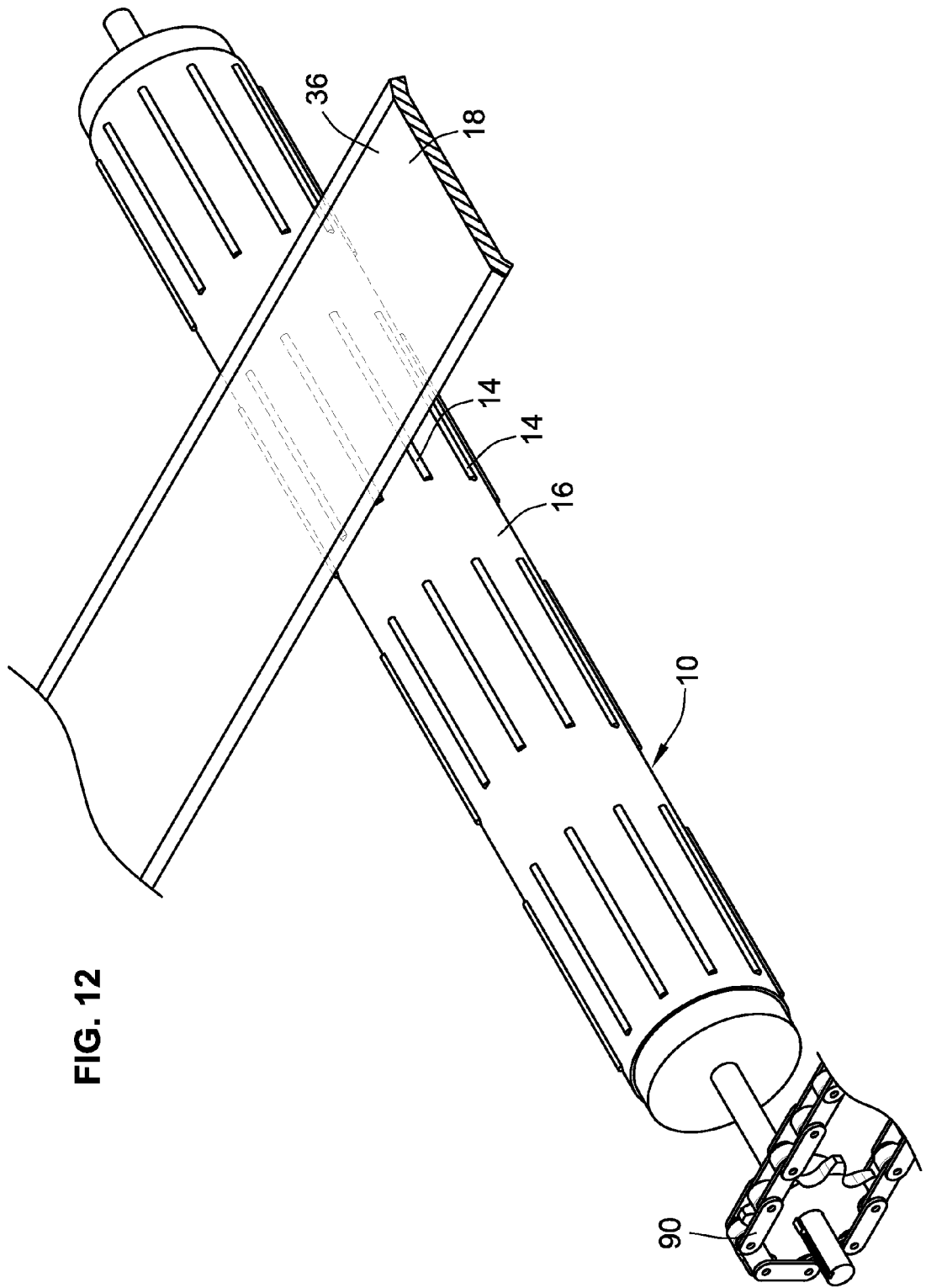

Turning to FIGS. 11-13, an exemplary baler 20 is illustrated to generally include a baler body 22, which is generally the structure and housing of the baler. This baler body is situated on wheels 24 such that it is mobile and may be pulled behind a tractor by means of a hitch 26.

At an area in front of the wheels 24, a collection apparatus 28 is provided, which typically includes a pick up including a plurality of tines that are arranged to collect the hay from a ground surface and move the hay into the baler body 22. As the hay moves into the baler body 22, it enters a bale forming chamber 30, which is expandable during operation to accommodate an incipient log of hay that eventually is coiled around and wound up into a large round or cylindrical hay bale that can then be extracted and dispatched from the hay baler. A good example of this can be seen in the various figures of Wagstaff et al. U.S. Pat. No. 5,444,969.

At the entrance of the bale forming chamber 30, different rolls 32 may be provided that are free of a belt, but have an entrance region 34 therebetween through which hay material enters into the bale forming chamber 30. Further, a compression element would comprise at least one and typically more such as four endless belts 36 are provided around the generally cylindrical bale forming chamber 30 and thereby, a portion of the endless belts 36 defines at least a portion or part of the bale forming chamber 30. The endless belts 36 are mounted upon axially extending guide rolls 38 for movement along an endless path. The guide rolls 38 are not driven, but merely serve to direct and guide the endless belts 36 along the endless path.

To provide for movement of the endless compression belts 36, at least one drive roll 10 is provided as shown. Rotation of the drive roll 10 causes corresponding movement of the endless belt 36 along the endless path.

This type of hay baler 20 may generally be in accordance with other prior hay balers such as shown in U.S. Pat. No. 5,444,969 or U.S. Publication Number 2013/0032047, except for the hay baler shown herein include one of the embodiments of the drive roll 10 (a roll primitive embodiment shown in FIGS. 5-10). Generally, the drive roll 10 provides for better engagement and reduced gross slippage with the endless belts 36 due to the drive ribs 14, which are formed on the outer cylindrical surface 16 of the drive roll 10.

For example, the configuration and/or hardness of the drive ribs 14 may provide for reduced gross slippage or elimination of micro slippage between the drive roll 10 and the endless belts 36 during rotation and operation over prolonged periods of time.

Additionally, or alternatively, the drive ribs 14 may have means for centering that can be provided by a profile difference among the drive ribs. For example, the drive ribs may taper from a center region outwardly in both radially extending height and/or circumferential thickness as shown in the embodiment shown in FIGS. 5-10.

Turning back to greater detail then to the drive roll 10, and referring to FIGS. 1-4, the drive roll typically includes multiple sets 40 of the drive ribs 14. Each set 40 of drive ribs 14 is positioned at a different axial location along the axial length of the drive roll 20. With this arrangement, each set of drive ribs is therefore, spaced axially from each other set of drive ribs.

In this embodiment, the multiple sets include a pair of end sets 40a on opposed ends, which are disposed proximate drive mount stubs 42. Preferably though, there is an axial gap 44 in spacing from the end of the cylindrical surface 16 that forms circular edge 46. Typically, the spacing is between 1 and 50 millimeters. The spacing better provides for engagement of a corresponding belt, which may drape over opposed axial ends of each drive rib 14 in the end set 40a.

Additionally, intermediate sets 40b are provided between end sets 40a with axial gaps and spaces therebetween. With four different sets 40 of drive ribs being provided, there are, therefore, two intermediate sets in this embodiment. Other embodiments may include more or less.

As shown, typically at least five drive ribs 14 are arranged in each set 40. In the particular embodiment shown, ten different drive ribs are arranged in a set. The number of drive ribs may depend upon the relative height and diameter of the cylindrical surface.

For example, in one embodiment, at a point 48 intermediate adjacent drive ribs of any given set, a tangent 50 is defined (shown in dashed lines). The adjacent drive ribs project from the cylindrical surface to within 1 millimeter of the tangent. With this configuration, the endless belt will engage the drive ribs, but also ride along in contact with at least a portion of the outer cylindrical surface between adjacent drive ribs. Further, when the drive roll is placed, therefore, on a flat surface, typically one and most typically at least two drive ribs will normally engage that surface. This provides for sufficient contact when employed in use with an endless belt wrapped partially around the drive roll as the design has the effect of concentrating the belt pressure on the rib enhancing the traction effect and reducing gross slippage. It is noted that the belt and the rubber inner periphery thereof has resilience such that the ribs 14 will ordinarily project in resilient relation into the belt.

During operation and during rotation of the drive roll, the drive ribs 14 will, therefore, successively engage the endless belts.

In a preferred arrangement, each of the drive ribs 14 extend axially and substantially parallel with the central axis.

Each of the drive ribs may be discreetly formed from each other as separate discreet bodies of material.

Each individual drive rib may be a continuous strip laid down upon the outer cylindrical surface as shown, or may alternatively be discontinuous.

With this configuration, each set of drive ribs 14 is configured for driving a different endless belt 36. Therefore, each one of the multiple sets 40 is dedicated to a corresponding one of the endless belts 36.

Additionally, as shown in FIG. 4, the drive rib 14 may have a continuously curved and non-flat outer surface 52 in the circumferential direction, that is different than the curvature and with a different center point than that of the outer cylindrical surface 16. This has the effect during operation of concentrating belt pressure on and circumferentially around the rib to reduce gross slippage and micro slippage. Preferably, the effective radius of the rib outer surface 52 is substantially less than the radius of the outer cylindrical surface 16, with the radius of the rib outer surface 52 in the circumferential direction being at least five times smaller than that of the outer cylindrical surface 16.

Further, to provide for longevity and also good engagement, the drive ribs 14 are typically made of a different material than the steel material of the drive roll body 12. For example, the drive ribs 14 are separately formed through a separate process upon the drive roll body 12.

In one embodiment, the drive ribs are clad and preferably laser clad integrally upon the steel material of the outer cylindrical surface. The laser cladding material being shown at 54, while the steel material being shown at 56 in FIG. 4. The wear life of the clad roller is much greater than rollers known in the prior art, such as those with an outer periphery coated in rubber. This is especially true in sandy conditions.

When laser cladding is employed, preferably, it comprises tungsten carbide, but may also comprise alternatively titanium carbide, chrome carbide, iron carbide, diamond, ceramics and/or other high hardness particles in the range of HV 1200-2500 on the Vickers scale hardness. The thickness and radial height of each drive rib is typically between 1 and 10 millimeters, more typically between 2 and 6 millimeters and may be between 2 and 4 millimeters in a preferred embodiment. Similarly, the circumferential thickness (CT) may also be between 1 and 10 millimeters, more typically between 2 and 6 millimeters in an embodiment. These ranges are provided for the maximum radial height (RH) and maximum circumferential thickness (CT).

Turning then to FIGS. 5-9, another embodiment is shown similar to the first embodiment and the entire description related to the first embodiment of drive roll 10 and the drive ribs 14 of FIGS. 1-4 is also applicable to the second embodiment of the drive roll 70 unless otherwise indicated. As such, the focus will be on the additional features and structural distinctions provided by drive roll 70, which have a slightly different configuration for the drive ribs 72 of this embodiment. Drive roll 70 may also be employed for drive roll 10 in the hay baler 20 and for driving the endless compression belts 36 shown in FIGS. 11-13. Specifically, drive roll 70 may be considered the same or substitute for drive roll 10 in FIGS. 11-13.

The drive ribs 72 on the drive roll 70 are just like the drive ribs 14 shown in the previous embodiment with multiple sets 40 also being provided with the same configuration and arrangement. However, in this embodiment, the drive ribs taper from a central region 74 as each drive rib extends axially toward end regions 76 on either side of the central region 74. This provides a tapering profile, which may be used to center the endless belt.

For example, FIG. 13a shows an enlarged view of a drive rib 14. Each belt may have a central belt section 58 and inwardly tapering end sections 60 on either side of the central belt section 58, which drape over opposed ends of each drive rib during operation. The tapering profile 78 shown in the second embodiment enhances and provides additional structure for centering and maintaining proper alignment between the endless belts 36 and the drive roll 70. As shown in FIGS. 8-10, and as can be seen in FIGS. 5-6, the tapering can be both circumferential and also radial. Thus, the tapering can be in two directions, although it may be in only one direction in some embodiments.

For example, the central region, which defines the maximum radial thickness (e.g. which may be between 1 and 10 millimeters) may taper to a reduced radial height (RH) at end sections that is at least 25% to 100% less than the maximum radial height (RH). Typically, the center region tapers into the end region with a decreasing radial thickness of at least ½ millimeter, which can be seen with the dashed line bridging FIGS. 8 and 10 showing the difference or delta in radial height (RH) between the maximum at the central region and reduced height at the end regions.

Additionally, there can also be seen especially in FIG. 8, a reduction in circumferential thickness (CT) from the central region 74 to the end regions 76 with a reduction that is at least 25% to 100% less in the end regions as compared with the maximum circumferential thickness at the central region. This difference is shown at 82 (the radial thickness delta being shown at 80).

For any of the embodiments described above, laser cladding can be employed to form the drive ribs 14 integrally upon the drive roll body 12 while at the same time, providing for a harder material, if desired. When a tapering profile is desired, control of the laser cladding tool can be made to vary the profile in at least one of the circumferential thickness or radial thickness of the at least one drive rib 72 as shown in the second embodiment 14 for the first embodiment. This may include increasing processing speeds to make thinner sections and decreasing processing speeds to make thicker sections. For example, the laser cladding tool can be run faster or slower, which correspondently deposits more or less material. Alternatively, laser power can be varied through a pass to change the deposition rate. Alternatively, or in addition, the powder flow rate through a laser tool pass can be made to change the cladding height. Finally, another alternative or addition is that multiple passes of varying length can be made with laser cladding side by side and/or on top of each other to create a higher profile in the central region of the at least one drive rib or wider region if desired.

In many applications, the drive roll will have a total axial length of between 100 and 300 centimeters. Each individual drive rib (whether continuous or not), will have a total axial length of between 5 and 40 centimeters in most embodiment. Each drive roll 10 is typically driven on one or both ends by a chain drive with sprocket 90, belt drive with sheave, or hydraulic motor with impeller. FIG. 12 illustrates an example of a chain driven drive roll 10 on one of its ends.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hay baler, comprising:
   a baler body having therein a bale forming chamber for forming bales;
      a plurality of guide rolls mounted in the baler body;
      at least one endless belt supported by the guide rolls for movement along an endless path, a portion of the endless belt defining at least part of the bale forming chamber;
      a drive roll engaging the at least one endless belt, the drive roll comprising a drive roll body having an outer cylindrical surface of a first material, and
   at least one drive rib projecting from the outer cylindrical surface, the at least one drive rib being formed of a second material different than the first material; wherein the at least one drive rib includes a portion with a tapering profile as the drive rib extends axially such that the tapering profile centers the at least one endless belt.

2. The hay baler of claim 1, wherein the at least one drive rib has a continuously curved and non-flat outer surface in the circumferential direction, which has the effect during operation of concentrating belt pressure on and circumferentially around the rib to reduce or eliminate micro-slippage between the at least one endless belt and the drive roll.

3. The hay baler of claim 1, wherein at least 5 drive ribs are arranged in a set, the drive ribs in the set being angularly spaced at intervals around the central axis of the drive roll body and forming a drive engagement with an endless belt, wherein during rotation of the drive roll, the drive ribs successively engage the at least one endless belt to drive the endless belt, wherein each of the drive ribs are discretely formed from each other and aligned substantially parallel with the central axis.

4. The hay baler of claim 1, wherein the first material comprises steel, and the second material comprises cladding, the cladding being integrally clad upon the steel, the cladding comprising at least one of tungsten carbide, titanium carbide, chrome carbide, iron carbide, diamond, ceramics, and other high hardness particles in the range of HV 1200-2500 (Vickers scale hardness).

5. The drive roll of claim 1, wherein the at least one drive rib has a central region having a maximum radial thickness of between 1 and 10 millimeters, the central region sandwiched between end regions on opposed axial sides of the central region, the end regions including a radial thickness that is at least 25% to 100% less than the maximum radial thickness, wherein the central region tapers into the end region with decreasing radial thickness of at least ½ millimeter.

6. The drive roll of claim 1, wherein the at least one drive rib has a central region having a maximum circumferential thickness of between 1 and 10 millimeters, the central region sandwiched between end regions on opposed axial sides of the central region, the end regions including a circumferential thickness along the outer cylindrical surface that is at least 25% to 100% less than the maximum circumferential thickness, wherein the central region tapers into the end region with decreasing circumferential thickness of at least ½ millimeter.

7. A hay baler, comprising:
a baler body having therein a bale forming chamber for forming bales;
a plurality of guide rolls mounted in the baler body;
at least one endless belt supported by the guide rolls for movement along an endless path, a portion of the endless belt defining at least part of the bale forming chamber;
a drive roll engaging the at least one endless belt, the drive roll comprising a drive roll body having an outer cylindrical surface of a first material, and
at least one drive rib projecting from the outer cylindrical surface, the at least one drive rib being formed of a second material different than the first material; wherein at least 5 drive ribs are arranged in a set and wherein a plurality of sets of drive ribs are provided, each set of drive ribs being spaced axially from another set of drive ribs, each set for driving a different endless belt, at least one intermediate of the sets of drive ribs being disposed intermediate axially between end sets of the drive ribs; and
wherein the at least one drive rib includes a onion with a ofile as the drive rib extends axially such that the tapering profile centers the at least one endless belt.

8. A hay baler, comprising:
a baler body having therein a bale forming chamber for forming bales;
a plurality of guide rolls mounted in the baler body;
at least one endless belt supported by the guide rolls for movement along an endless path, a portion of the endless belt defining at least part of the bale forming chamber;
a drive roll engaging the at least one endless belt, the drive roll comprising a drive roll body having an outer cylindrical surface of a first material, and
at least one drive rib projecting from the outer cylindrical surface, the at least one drive rib being formed of a second material different than the first material; wherein at a point intermediate adjacent drive ribs of a set a tangent is defined, the adjacent drive ribs projecting from the cylindrical surface to within 1 millimeter of the tangent, wherein the endless belt will engage the drive ribs and also ride along in contact with at least a portion of the outer cylindrical surface between adjacent drive ribs.

9. A drive roll for a driving belt, comprising:
a drive roll body adapted for rotation about a central axis, the drive roll body having an outer cylindrical surface;
at least one drive rib projecting from the outer cylindrical surface; and
at least one drive rib includes a portion with a tapering profile as the drive rib extends axially, the tapering profile configured for axially positioning the belt.

10. The drive of claim 9, wherein the tapering profile is configured to provide means for centering an endless belt.

11. The drive roll of claim 9, wherein the drive roll comprises first material comprising steel, and the at least one drive rib comprises a second material comprising cladding, the cladding being integrally clad upon the steel, the cladding comprising at least one of tungsten carbide, titanium carbide, chrome carbide, iron carbide, diamond, ceramics, and other high hardness particles in the range of HV 1200-2500 (Vickers scale hardness).

12. The drive roll of claim 9, wherein the at least one drive rib has a central region having a maximum radial thickness of between 1 and 10 millimeters, the central region sandwiched between end regions on opposed axial sides of the central region, the end regions including a radial thickness that is at least 25% to 100% less than the maximum radial thickness, wherein the central region tapers into the end region with decreasing radial thickness of at least ½ millimeter.

13. The drive roll of claim 9, wherein the at least one drive rib has a central region having a maximum circumferential thickness of between 1 and 10 millimeters, the central region sandwiched between end regions on opposed axial sides of the central region, the end regions including a circumferential thickness along the outer cylindrical surface that is at least 25% to 100% less than the maximum circumferential thickness, wherein the central region tapers into the end region with decreasing circumferential thickness of at least ½ millimeter.

14. The drive roll of claim 9, wherein at least 5 drive ribs are arranged in a set, the drive ribs in the set being angularly spaced at intervals around the central axis of the drive roll body and forming a drive engagement with an endless belt, wherein during rotation of the drive roll, the drive ribs successively engage endless belt to drive the endless belt.

15. The drive roll of claim 14, wherein each of the drive ribs are discretely formed from each other and aligned substantially parallel with the central axis.

16. The drive roll of claim 14, wherein a plurality of sets of drive ribs are provided, each set of drive ribs being spaced axially from another set of drive ribs, each set for driving a different endless belt, at least one intermediate set of drive ribs being disposed intermediate end sets of the drive ribs.

17. The drive roll of claim 16, wherein at a point intermediate adjacent drive ribs of a set a tangent is defined, the adjacent drive ribs projecting from the cylindrical surface to within 1 millimeter of the tangent, wherein the endless belt will engage the drive ribs and also ride along in contact with at least a portion of the outer cylindrical surface between adjacent drive ribs.

18. The drive roll of claim 17, wherein the drive ribs have a continuously curved and non-flat outer surface in the circumferential direction, which has the effect during operation of concentrating belt pressure on and circumferentially around the rib to reduce or eliminate micro-slippage between the belt and the drive roll.

19. A drive roll for engaging at least one belt, comprising:
a drive roll body having an outer cylindrical surface of a first material;
at least one drive rib projecting from the outer cylindrical surface of a second material different than the first material; and a plurality of sets of drive ribs, each set of drive ribs being spaced axially from another set of drive ribs, at least one intermediate set of drive ribs being disposed intermediate axially between end sets of the drive ribs; and wherein each drive rib of each set of drive ribs further comprises a tapering profile as the drive rib extends axially such that the tapering profile centers an endless belt.

20. The drive roll of claim 19, wherein the first material comprises steel, and the second material comprises cladding, the cladding being integrally clad upon the steel, the cladding comprising at least one of tungsten carbide, titanium carbide, chrome carbide, iron carbide, diamond, ceramics, and other high hardness particles in the range of HV 1200-2500 (Vickers scale hardness).

21. The drive roll of claim 19, wherein at least 5 drive ribs are arranged in a set, the drive ribs in the set being angularly spaced at intervals around the central axis of the drive roll body and forming a drive engagement with an endless belt, wherein during rotation of the drive roll, the drive ribs successively engage endless belt to drive the endless belt.

22. The drive roll of claim 21, wherein each of the drive ribs are discretely formed from each other and aligned substantially parallel with the central axis.

23. The drive roll of claim 21, wherein a plurality of sets of drive ribs, each set of drive ribs being spaced axially from another set of drive ribs, each set for driving a different endless belt, at least one intermediate of the sets of drive ribs being disposed intermediate end sets of the drive ribs.

24. The drive roll of claim 21, wherein at a point intermediate adjacent drive ribs of a set a tangent is defined, the adjacent drive ribs projecting from the cylindrical surface to within 1 millimeter of the tangent, wherein the endless belt will engage the drive ribs and also ride along in contact with at least a portion of the outer cylindrical surface between adjacent drive ribs.

25. The drive roll of claim 24, wherein the drive ribs have a continuously curved and non-flat outer surface in the circumferential direction, which has the effect during operation of concentrating belt pressure on and circumferentially around the rib to reduce or eliminate micro-slippage between the belt and the drive roll.

* * * * *

UNITED STATES PATENT AND TRADEMARK OFFICE
CERTIFICATE OF CORRECTION

PATENT NO. : 9,205,984 B2
APPLICATION NO. : 13/901278
DATED : December 8, 2015
INVENTOR(S) : Scott W. Moon et al.

It is certified that error appears in the above-identified patent and that said Letters Patent is hereby corrected as shown below:

In the Claims:

Column 9, Line 41, Claim 7,
The word "onion" should correctly read "portion".

Column 9, Line 42, Claim 7,
The word "ofile" should correctly read "tapering profile".

Signed and Sealed this
Eighth Day of March, 2016

Michelle K. Lee
*Director of the United States Patent and Trademark Office*